(12) United States Patent
Perritt, Jr.

(10) Patent No.: US 12,119,626 B1
(45) Date of Patent: Oct. 15, 2024

(54) SYSTEM AND METHOD FOR LIFTING LINES OVER A SUPPORT USING A DRONE

(71) Applicant: Henry Hardy Perritt, Jr., Charlottesville, VA (US)

(72) Inventor: Henry Hardy Perritt, Jr., Charlottesville, VA (US)

( * ) Notice: Subject to any disclaimer, the term of this patent is extended or adjusted under 35 U.S.C. 154(b) by 0 days.

(21) Appl. No.: 18/600,707

(22) Filed: Mar. 9, 2024

(51) Int. Cl.
| | |
|---|---|
| H02G 1/02 | (2006.01) |
| B64C 39/02 | (2023.01) |
| B64U 10/14 | (2023.01) |
| H02G 11/02 | (2006.01) |
| B64U 101/26 | (2023.01) |

(52) U.S. Cl.
CPC ............ *H02G 1/02* (2013.01); *B64C 39/024* (2013.01); *B64U 10/14* (2023.01); *H02G 11/02* (2013.01); *B64U 2101/26* (2023.01); *B64U 2201/20* (2023.01)

(58) Field of Classification Search
CPC .......... H02G 1/02; H02G 11/02; B64U 10/14; B64U 2201/20; B64U 2101/26; B64C 39/024
USPC ............................................................ 701/2
See application file for complete search history.

(56) References Cited

U.S. PATENT DOCUMENTS

| | | | |
|---|---|---|---|
| 9,266,596 B2 * | 2/2016 | Heppe ........................ B64B 1/50 |
| 9,422,139 B1 * | 8/2016 | Bialkowski ............. B66C 13/06 |
| 9,817,396 B1 * | 11/2017 | Takayama ............ G08G 5/0013 |
| 10,329,016 B1 | 6/2019 | Jackson et al. |
| 11,235,890 B1 * | 2/2022 | Dahlstrom ............. B64U 10/60 |
| 2004/0051619 A1 * | 3/2004 | Bryan ....................... G01V 3/17 |
| | | | 336/192 |
| 2007/0200027 A1 * | 8/2007 | Johnson ................. B64U 10/60 |
| | | | 244/3.1 |
| 2013/0233964 A1 * | 9/2013 | Woodworth ........... B64D 17/80 |
| | | | 244/175 |
| 2016/0207626 A1 * | 7/2016 | Bailey .................... B64C 39/022 |
| 2018/0312247 A1 * | 11/2018 | Ichihara .................. B64C 39/02 |
| 2019/0023520 A1 | 4/2019 | Robertson et al. |
| 2019/0135437 A1 * | 5/2019 | Halevy ..................... B64D 1/22 |
| 2021/0009285 A1 * | 1/2021 | Talke .................... H02G 11/003 |
| 2022/0048621 A1 * | 2/2022 | Tazume ................... B64D 1/12 |
| 2022/0144449 A1 * | 5/2022 | Gamble .................... B64F 1/08 |
| 2022/0250768 A1 | 8/2022 | Oshima et al. |

(Continued)

FOREIGN PATENT DOCUMENTS

| | | | | |
|---|---|---|---|---|
| CA | 3030239 A1 * | 7/2019 | .......... B64C 39/024 |
| CN | 109244943 B | 2/2020 | |
| EP | 3674213 A1 * | 7/2020 | ............. B41J 2/175 |

(Continued)

*Primary Examiner* — Tuan C To

(57) ABSTRACT

The system and method involve an unmanned aerial vehicle, a pilot line, a winding mechanism, and a remote control device. The unmanned aerial vehicle is of the rotorcraft type and has a coupling for the pilot line. The pilot line is wound around the winding mechanism and connecting to the unmanned aerial vehicle. The remote control device accepts commands from a human operator and transmits control signals to the unmanned aerial vehicle, causing it to lift the pilot line over a support element. A payload line then is attached to the end of the pilot line. The human operator uses a winding device to wind the pilot line back around the winding mechanism, pulling the attached payload line over the support element.

20 Claims, 7 Drawing Sheets

(56) References Cited

U.S. PATENT DOCUMENTS

2024/0017825 A1* 1/2024 Blake .................. B64C 1/20
2024/0190278 A1* 6/2024 Lacaze ................ B60L 53/35

FOREIGN PATENT DOCUMENTS

| EP | 3882144 A1 * | 9/2021 | ........... B64C 39/022 |
|----|--------------|--------|------|
| EP | 3917829 A1 | 3/2022 | |
| KR | 101969138 B1 | 4/2022 | |
| WO | WO-2013052178 A2 * | 4/2013 | ............... B64B 1/50 |

* cited by examiner

SYSTEM AND METHOD FOR LIFTING LINES OVER A SUPPORT USING A DRONE

CROSS-REFERENCE TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A READ-ONLY OPTICAL DISC, AS A TEXT FILE OR AN XML FILE VIA THE PATENT ELECTRONIC SYSTEM

Not applicable

STATEMENT REGARDING PRIOR DISCLOSURES BY THE INVENTOR OR A JOINT INVENTOR

Not applicable

TECHNICAL FIELD

The invention pertains to systems and methods for lifting lines such as antenna wires, communication cables, or power lines over supports like antenna towers or telephone poles. It involves the use of a rotatable reel, a pilot line, a sharpened stake, and a consumer drone.

BACKGROUND

In various fields such as telecommunications, radio broadcasting, and power distribution, there is often a need to lift lines such as antenna wires, communication cables, or power lines over overhead supports like antenna towers or telephone poles. Wires carrying electricity, telephone signals, and video signals must be placed on cross arms extending from utility poles. Long wire antennas must be lifted over horizontal extensions of antenna towers intended to support them. Guy wires and support cables must be lifted to their attachment points on the structures they are intended to support.

The means used to accomplish these tasks are time-consuming, labor-intensive, expensive, cumbersome and, in many cases, dangerous to the safety of their operators, especially when dealing with high structures or electrically energized power lines. Personnel climb towers extending several hundred feet into the air to lift wires over support elements. A fall from such a height can be fatal. For structures of moderate heights, operators can use mechanical buckets attached to booms popularly known as "cherry pickers" to lift them and wires to the height of support elements. In some cases, personnel use projectiles fired from an apparatus like a potato cannon or an archery bow in an attempt to carry a line over a support element.

Many support elements are too high above the ground to make reaching them by means of a ladder practicable. Instead personnel must climb poles or towers, use personal buckets attached to movable blooms ("cherry pickers") or, less often, use helicopters. Climbing towers or poles pose safety risks to the personnel engaged in the activity. Using cherry pickers or helicopters imposes significant costs for the equipment and also incurs hazards to the personnel riding the cherry picker or the helicopter.

Moreover, the process can be challenging in certain weather conditions or in areas with limited access. Therefore, there is a need for a more efficient and safer method to perform this task.

Efforts to lift lines over high support elements by means of projectile launchers suffer from imprecision and the risk of damage from the projectile.

A particular difficulty is that many types of payload line are too heavy to be hoisted up and lifted directly over a support arrangement. For example even relatively modest-gauge antenna wire such as 14-gauge wire, popular for long-wire antennas, is too heavy to be lifted by a consumer drone.

SUMMARY OF THE INVENTION

The present invention avoids the safety risks of tower climbing, the cost of cherry pickers, and the imprecision of projectiles in lifting lines over support elements. It is operable in all but the severest weather conditions, which would make human access alternatives uncomfortable or unsafe. It permits placement of wires and cables over supports that are inaccessible from the ground or nearly so. It permits placement of payload lines such as antenna wires, or communications or power cables that are too heavy to be lifted by a small drone. It offers a method to lift power lines over supports, which is a necessary part of building and maintaining electrical grids, services, and electrical power distribution networks.

It employs an unmanned aircraft of the rotorcraft type, an adequate length of light pilot line wound around a reel, a stake attached to the reel that can be pressed into the ground, holding the reel steady, an attachment connecting the aircraft to the pilot line, a remote control device capable of communicating with the aircraft by radio which transmits control signals to the unmanned aerial vehicle, an overhead support element, and a payload line intended to be pulled over the support element by the pilot line, and a winding device used to wind the pilot line back around the winding mechanism once the aircraft has carried the pilot line over the support element.

One embodiment uses a widely available consumer drone of the quadcopter type as the aircraft and the associated control device delivered with the drone, a length of lightweight fishing line of the filament type, wound around a commercial flyfishing reel, a commercially available metal stake attached to the reel by zip ties, a payload line comprising an antenna wire of between 12 and 16 gauge, and a means for connecting the pilot line to the payload line: two simple loops in this embodiment secured by bowline knots in each line.

A human operator inserts the stake with its reel into the ground a distance horizontally from the support element approximating the height of the support element above the ground, attaches the end of the pilot line wound around the reel to the drone, launches the drone, and flies it by means of the control device high enough to clear the support element, thus pulling the pilot line over the support element. The pilot line is of adequate length, meaning that its length exceeds twice the length of the hypotenuse of the triangle formed by the height of the support element and its horizontal distance from the launching point, plus fifteen percent. The launching point is the place where the anchor or stake is inserted into the ground.

The human operator then causes the drone to descend by means of appropriate commands on the control device and to land at a horizontal distance from the support element approximately equal to the horizontal distance of the launching point from the support element, on its other side. The human operator then detaches the pilot line from the drone and secures it to the payload line. The human operator returns to the reel at the launching point and winds in the pilot line, carrying with it the payload line.

The particular type of commercial drone used is immaterial. Almost any model offered in the market is capable of carrying a substantial length of pilot line and of ascending the several hundred feet necessary to clear conceivable support elements.

In another embodiment, the pilot line is secured to the drone by means of physical connectors such as clamps or hooks attached to the end of the pilot line and to the drone respectively. The connector at the end of the pilot line is connected to a matching connector at the end of the payload line. The attachment has sufficient strength to withstand the force involved in as the pilot line pulls the payload line over the support element.

In yet another embodiment, placement of the stake and reel into the ground is preceded by the step of flying the drone over the support element to determine its height. The drone then is flown a horizontal distance equal to that height and landed there to mark the point where the stake and reel are fixed and the launching point for subsequent operations determined.

In still another embodiment, the pilot line consists of lightweight material other than a filament fishing line such as wire of 21 or higher gauge, or synthetic material of similar diameter to filament fishing line.

The system has considerable advantages over present methods to lift lines across support elements. Not only does it does it enhance safety, it also avoids the need for a lifting machine of sufficient power to lift a heavy payload line.

Figure 1:
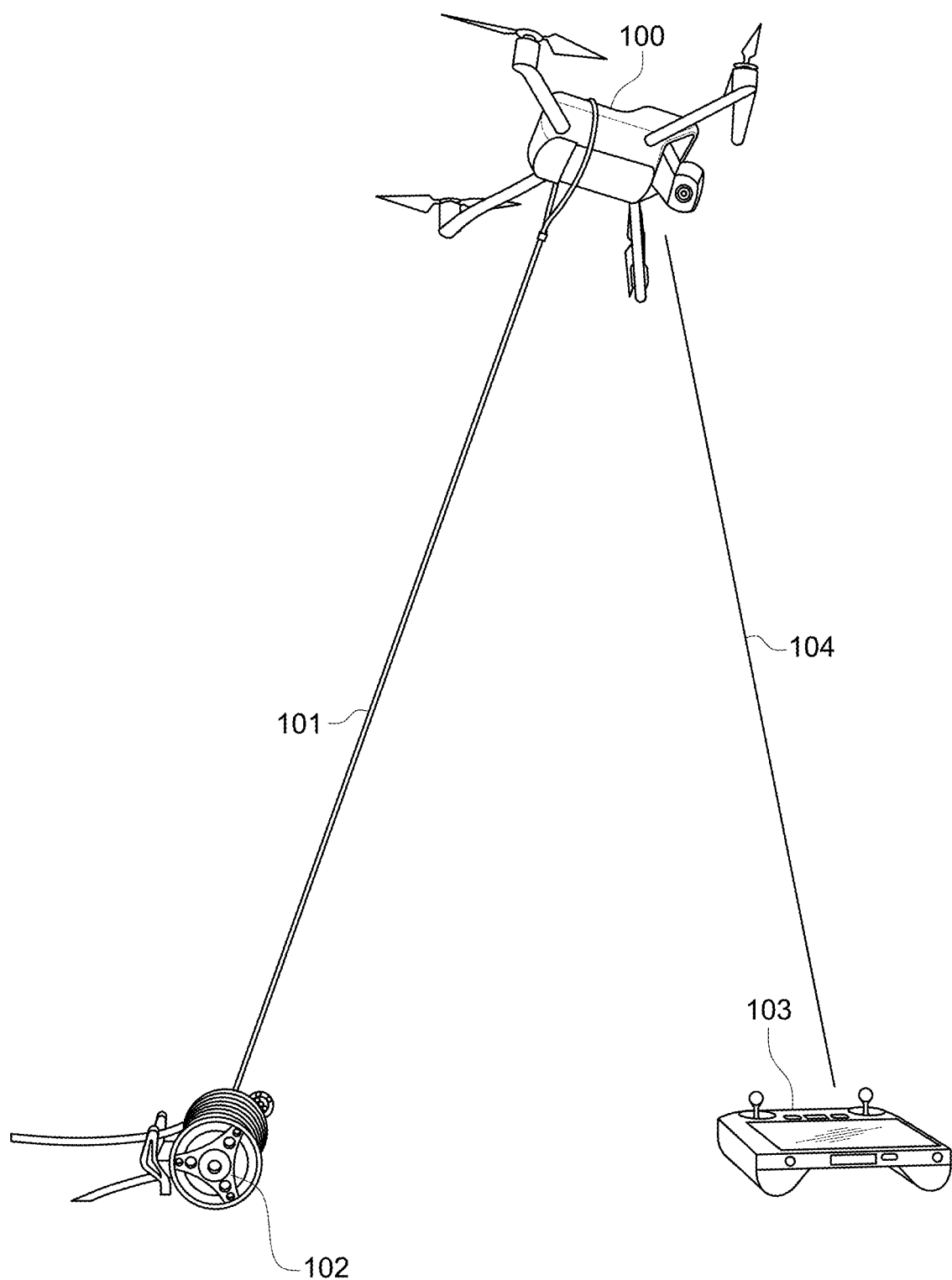
FIG. 1 illustrates the drone pulling the pilot line off the reel according to commands transmitted from the remote control device.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE INVENTION

The bight of a line, wire, or rope is the body, as opposed to an end. A bowline knot is an ancient and simple knot used to form a fixed loop at the end of a line, wire, or rope. The drone 100 is an unmanned aerial vehicle of the rotorcraft type. Fly fishing gear is apparatus for catching fish, comprising a flexible fishing rod, a rotatable reel with a crank fixed to its base, and lightweight fishing line wound around the reel. The launching point is the place where the anchor or stake 201 is driven into the ground, step 606. A quadcopter is a type of unmanned aerial vehicle with four rotors.

The invention involves an overhead support element 501, a pilot line 101 wound around a winding mechanism or reel 102 anchored to the ground by an anchor such as a stake 201, a unmanned aerial vehicle, a "drone" with rotors 100 such as a consumer quadcopter, which lifts the pilot line 101 over the support element 501, and a payload line 401 intended to be pulled over the support element 501 by the pilot line 101, and a winding device such as a crank 204 used to wind the pilot line back around the reel 102 once the aircraft has carried the pilot line 101 over the support element 501.

FIG. 1 provides a macroscopic view of major elements of the system. It shows a pilot line such as a filament fishing line 101 wound around a reel 102 attached to a drone, a widely available consumer unmanned aircraft of the helicopter or quadcopter type 100 which is flown overhead pursuant to radio commands 104 transmitted from an associated remote control device or device 103 delivered with the drone 100, which communicates with the drone by radio to transmit control signals constituting flight commands from the remote control device 103 sent by a human operator.

Figure 2:
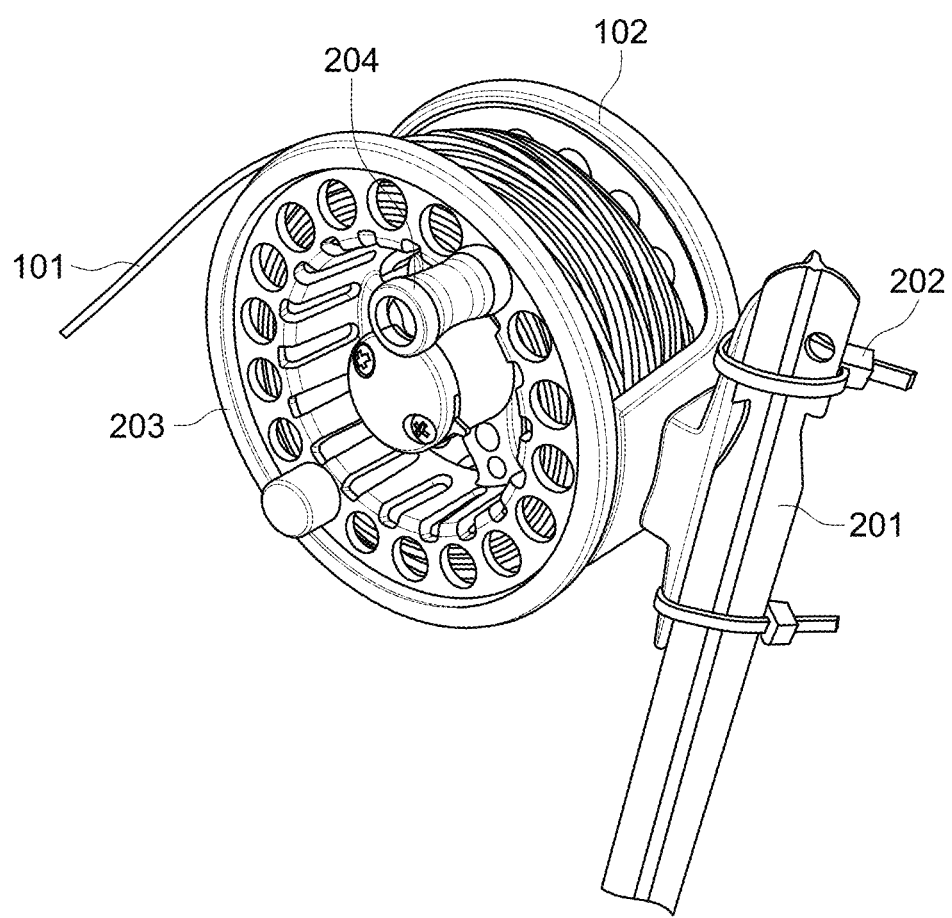
FIG. 2 illustrates the reel attached to the stake with the pilot line wound around the reel.

FIG. 2 shows a closeup of the winding device or rotatable reel 102 with the pilot line 101 wound around it. The rotatable reel is one typically provided in commercial fly fishing gear. The reel 102 is attached to an anchor or stake 201 by means of fasteners 202 allowing the stake 201 to be pressed or driven into the ground thus supporting the reel 102 firmly as the pilot line 101 is unwound from it as the drone 100 pulls on the pilot line 101. The rim of the reel 203 confines the pilot line on the reel as it is being unwound. A handle or crank on the reel 204 constitutes a winding device that permits the pilot line easily to be rewound around the reel once the pilot line 101 is free from the drone 100 and attached to the payload line 401.

Figure 3:
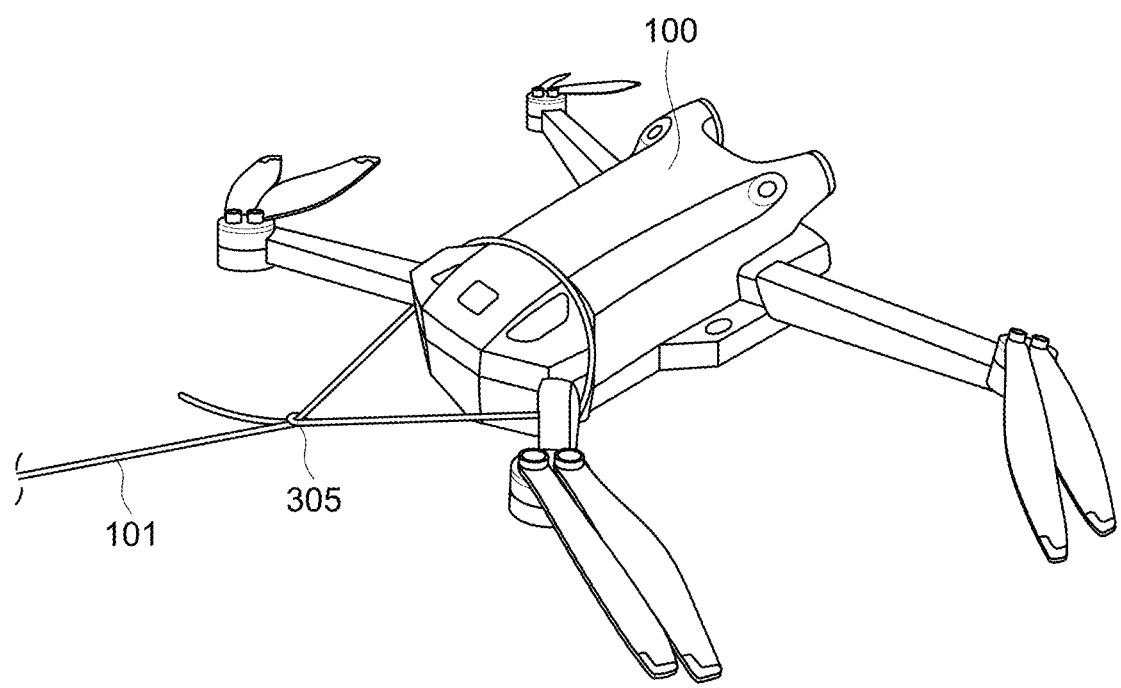
FIG. 3 illustrates the drone with the pilot line looped around its body secured by a knot

FIG. 3 depicts the attachment of the pilot line 101 to the drone 100. In the mode illustrated the attachment is effected by a loop around the drone's body forward of its rear booms with the end of the pilot line secured to the bight of the pilot line with a bowline knot. Several alternative coupling-device arrangements or connections are possible, including different knots securing a loop, or matching connectors such as closable hooks securely attaching the end of the pilot line 101 to the drone 100.

Figure 4:
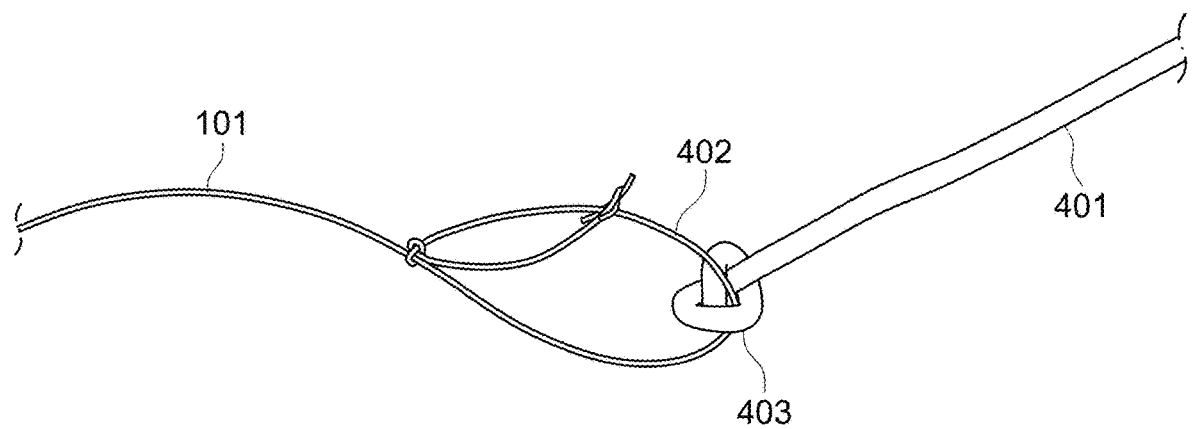
FIG. 4 illustrates the support element secured to a vertical structure

In the embodiment depicted by FIG. 4, the pilot line is a length of lightweight fishing line of the filament type 101, wound around a commercial flyfishing reel 102, a commercially available metal stake 201 attached to the reel by zip ties 202, a payload line 501 comprising an antenna wire of between 12 and 16 gauge, and a means for connecting the pilot line to the payload line: an intersecting loop 402 in the pilot line 101 and a knot 403 in the payload line 401.

In an alternative embodiment, the coupling device is two simple loops 402 in each of the two lines secured by bowline knots 403 tied to the bight of each line.

FIG. 4 depicts the payload line 401 attached to the pilot line 101. In the embodiment depicted, the two lines are linked by means of a loop in the pilot line 402 with a knot in the payload line 403 tied around it. The knot, 403 preferably would be of a secure form such as a bowline. It might be replaced by a loop resembling that of 402 tied in the pilot line 101. Or, both the loop 402 and the knot 403 might be replaced by other connection points such as metal, plastic, or wooden connectors such as closable hooks that mate with each other securely.

Figure 5:
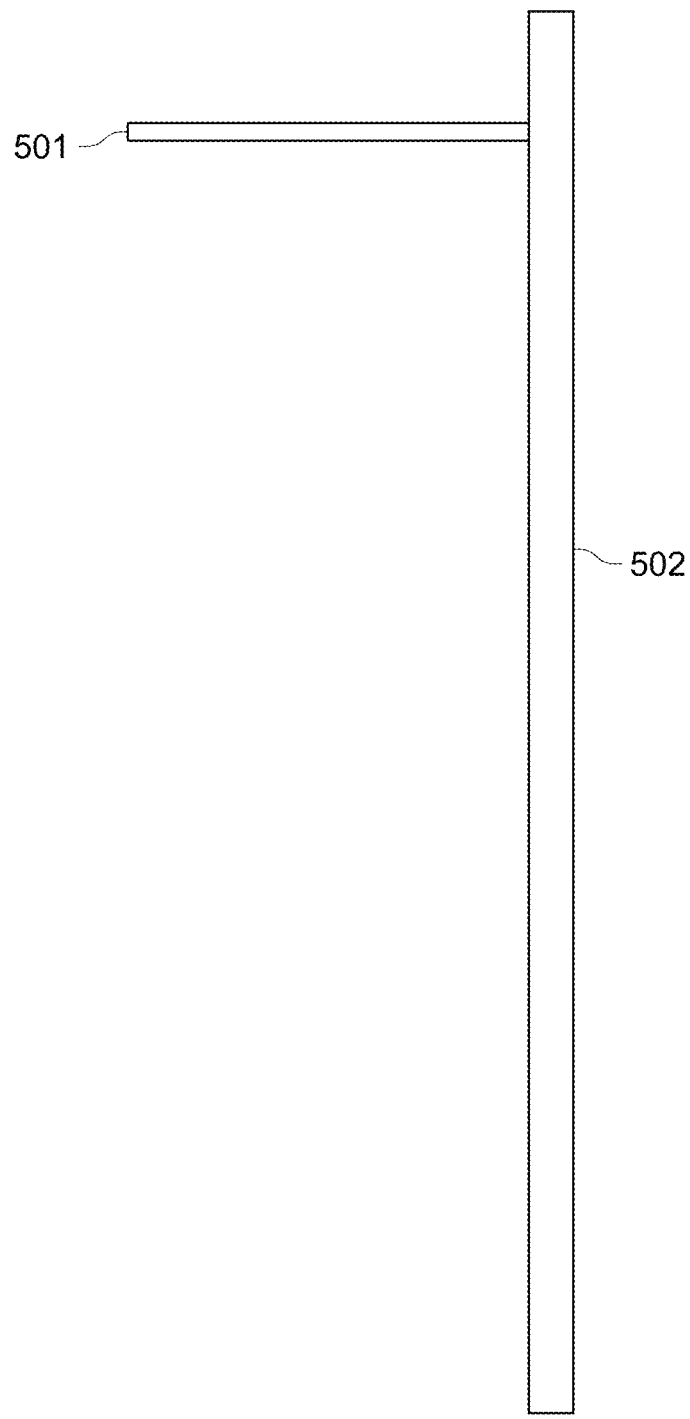
FIG. 5 illustrates the pilot line attached to the payload line.

FIG. 5 depicts the support element 501 attached to a vertical structure 502. The vertical structure might be a tree 502 holding a limb 501 as a support element. It might be an antenna tower 502 with a support element 501 attached to it and protruding horizontally from it. It might be a utility pole 502 with a cross arm 501 mounted to it.

Figure 6:
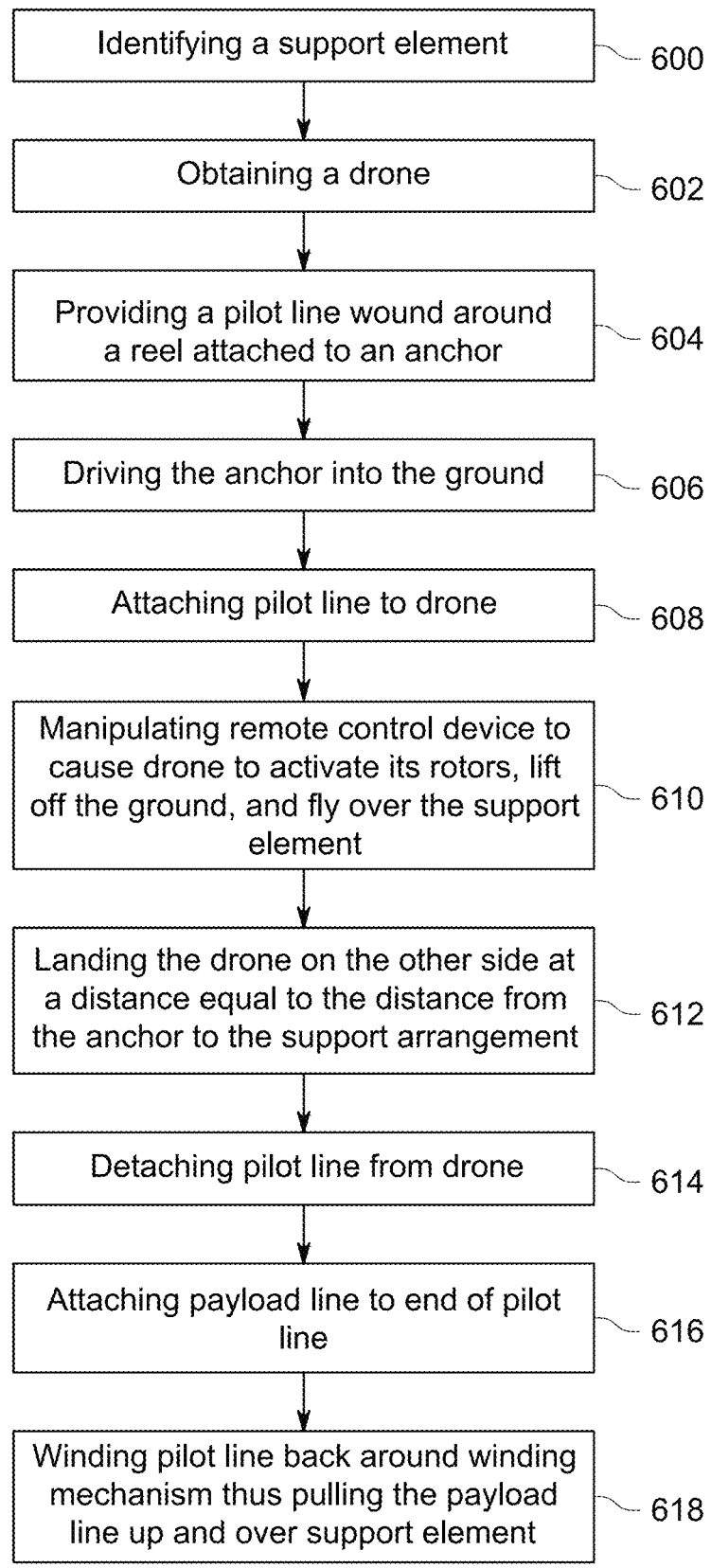
FIG. 6 is a flowchart illustrating the sequential steps in the method of using the drone to pull a pilot line over the support element from the reel, thereafter placing it on the ground and securing the pilot line to a payload line which is then pulled up and over the support element by winding the pilot line back around the reel.

FIG. 6 is a flowchart which shows how the components of the system are used in practice.

The process begins with step 600 by the human operator's identifying a support element 501 over which the payload line 401 is to be lifted The human operator obtains a drone at step 602, Then, at step 604, the human operator is provided with a pilot line of sufficient length 101 wound around a reel 102 which is attached to a stake 201.

The human operator then, at step 606, drives or presses the stake 201 into the ground at a horizontal distance from the support element 501 approximately equal to the support element's height above the ground. The human operator pulls a short length of pilot line 101 from the reel 102, attaches the end of the pilot line to the drone, at step 608, by means of a loop tied back to the pilot line with a bowline knot 305, and, in step 610, by giving appropriate commands to the drone 100 through the control device 103 causes the drone to activate its rotors, lift off the ground, and fly over the support element 501, carrying the pilot line 101 over the support element 501. The human operator then lands the drone, at 612, a distance approximately equal to the distance from the stake to the support element horizontally on the opposite side of the support element 501, detaches the pilot line 101 from the drone 100 in step 614, and, in step 616, attaches the payload line 401 to the pilot line 101.

The human operator returns to the reel 102 and the stake 201 and, using a winding device on the reel 204 pulls in the pilot line 101 with the payload line 401 attached to it in step 616, thus pulling the payload line up and over the support element 501.

Figure 7:
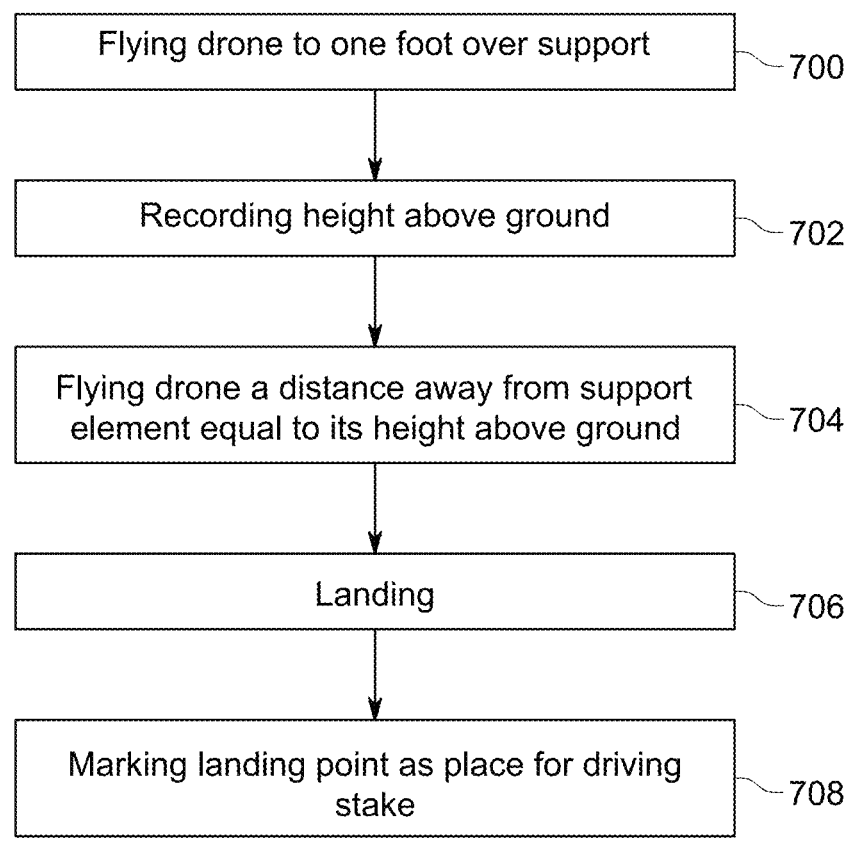
FIG. 7 illustrates an optional embodiment, in which the human operator flies the drone over the support element to determine its height and thereafter flies the same distance horizontally and lands to mark the point where the stake should be inserted into the ground.

In an alternative embodiment, depicted in FIG. 7, the step of inserting the stake 606 is preceded by flying the drone over the support element 700 to determine its height, recording the height 702, and thereafter flying a distance horizontally equal to the height 704 and landing 706 to mark the point where the stake should be inserted into the ground 708.

In practice, the operator would be an individual trained in UAV operation. The remote control device would be equipped with controls such as joysticks or buttons to enable precise command input. The UAV would incorporate technology to maintain stability and respond to the control inputs, such as gyroscopes and accelerometers.

A human operator who operates the system, may have various backgrounds, including radio operation, engineering, or utility services. The human operator's expertise ensures the proper handling and operation of the system to achieve the desired outcome of lifting and positioning the line.

An amateur radio operator might use the system to position antenna wires for better radio communication.

A radio engineer could employ the system in the installation or maintenance of antennas for broadcasting or communication purposes. Their work ensures that antennas are placed optimally for effective signal transmission.

A utility worker such as a telephone or cable employee or contractor would use the system to install, repair, or maintain communication cables or lines. The system aids in lifting lines over structures such as telephone poles to establish or restore services.

A utility worker such as an agent for an electric power company might use the system for the construction or maintenance of electric power cables or lines. The actions performed by the human operator facilitate the operation of the system and the accomplishment of the task at hand telecommunications workers, or power line technicians.

I claim:

1. A system for lifting a line over a support element, comprising:
    a pilot line of adequate length wound around a winding mechanism;
    an anchor fixed to the winding mechanism by fasteners, wherein the anchor is a sharpened stake fixed to the winding mechanism and inserted into the ground;
    an unmanned aerial vehicle of the rotorcraft type having a coupling means, wherein the coupling means comprises a loop in the pilot line encircling the unmanned aerial vehicle and secured to the bight of the pilot line;
    a connection between the end of the pilot line and the unmanned aerial vehicle comprising:
    a commercially available remote control device delivered with the unmanned aerial vehicle;
    a payload line attached to the end of the pilot line after the pilot line has been lifted over the support element by the unmanned aerial vehicle;
    a winding device allowing the human operator to wind the pilot line back around the winding mechanism, thus pulling the attached payload line with it over the support.

2. The system of claim 1, wherein the pilot line comprises a filament fishing line.

3. The system of claim 1, wherein the winding mechanism is a rotatable reel provided in commercial fly fishing gear.

4. The system of claim 1, wherein the anchor is fixed to the winding mechanism by zip ties.

5. The system of claim 1, wherein the coupling means comprises a first closable hook attached to a second closable hook.

6. The system of claim 1, wherein the loop in the pilot line encircling the unmanned aerial vehicle is secured to the bight of the pilot line with a bowline knot.

7. The system of claim 1, wherein the payload line wire is an antenna wire of 14 or between 12 and 16 gauge.

8. The system of claim 1, wherein the winding device is a crank on the reel used by the human operator to wind the pilot line back around the winding mechanism.

9. A method for lifting a line over a support, comprising the steps of:
- providing a pilot line of adequate length wound around a winding mechanism;
- fixing an anchor to the winding mechanism by fasteners, wherein the anchor is a sharpened stake fixed to the winding mechanism;
- inserting the anchor into the ground;
- providing an unmanned aerial vehicle of the rotorcraft type;
- attaching the end of the pilot line extending from the winding mechanism to the unmanned aerial vehicle, using a loop in the end of the pilot line extending from the winding mechanism, encircling the unmanned aerial vehicle;
- accepting commands from a human operator and transmitting control signals to the unmanned aerial vehicle via a commercially available remote control device delivered with the aerial vehicle
- causing the unmanned aerial vehicle to activate its rotors, lift off the ground, and fly in a direction according to human-operator commands thereby pulling the pilot line over the support element;
- landing the unmanned aerial vehicle a horizontal distance from the support element approximately equal to the support element's height above the ground;
- attaching a payload line to the end of the pilot line;
- using a winding device by the human operator to wind the pilot line back around the winding mechanism, thus pulling the attached payload line with it over the support.

10. The method of claim 9, wherein the pilot line comprises a filament fishing line.

11. The method of claim 9, wherein the winding mechanism is a rotatable reel provided in commercial fly fishing gear.

12. The method of claim 9, wherein the anchor is a sharpened stake fixed to the winding mechanism by zip ties.

13. The method of claim 9, wherein the coupling means is a closable hook.

14. The method of claim 9, wherein the loop encircling the unmanned aerial vehicle is secured by means of a bowline knot.

15. The method of claim 9, wherein the payload line comprises an antenna wire of 14 or between 12 and 16 gauge.

16. The method of claim 9, wherein the step of attaching the pilot line to the unmanned aerial vehicle is preceded by flying the unmanned aerial vehicle to the height of the support element, thence flying it horizontally a distance horizontally equal to the height, and landing, followed by driving the stake into the ground at that point.

17. The method of claim 9, further comprising the step of the unmanned aerial vehicle carrying the pilot line over the support member and landing and releasing the pilot line at a point on the ground approximately equal to the height of the support member above the ground, on the opposite side of the support member from the launching point.

18. The method of claim 9, in which the human operator is a utility worker, pulling a payload line comprising a communications cable.

19. The method of claim 9, in which the human operator is a utility worker, pulling a payload line comprising an electric power cable.

20. The method of claim 9, in which the human operator is an amateur radio operator.

* * * * *